United States Patent
Valenzuela et al.

(10) Patent No.: US 9,599,983 B2
(45) Date of Patent: Mar. 21, 2017

(54) SYSTEMS, METHODS, AND APPARATUS FOR AUTOMATED PREDICTIVE SHIMMING FOR LARGE STRUCTURES

(71) Applicant: The Boeing Company, Chicago, IL (US)

(72) Inventors: Dario Valenzuela, Snohomish, WA (US); Theodore M. Boyl-Davis, Snohomish, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 14/601,600

(22) Filed: Jan. 21, 2015

(65) Prior Publication Data

US 2016/0207638 A1   Jul. 21, 2016

(51) Int. Cl.
*G05D 1/00*         (2006.01)
*G01C 7/00*         (2006.01)
(Continued)

(52) U.S. Cl.
CPC .......... *G05D 1/0011* (2013.01); *B64F 5/0009* (2013.01); *G01C 7/00* (2013.01); *G01C 15/002* (2013.01); *G01C 15/06* (2013.01); *G01S 17/66* (2013.01); *G05B 19/401* (2013.01); *B64C 2201/12* (2013.01)

(58) Field of Classification Search
CPC .............................. B64F 5/0045; G05D 1/0011
See application file for complete search history.

(56) References Cited

U.S. PATENT DOCUMENTS 4,599,018 A * 7/1986 Woods ................. B23B 41/006
                                                408/1 R
4,674,949 A * 6/1987 Kroczynski ............... B25J 5/00
                                                114/222

(Continued)

FOREIGN PATENT DOCUMENTS

EP     2648016 A2    10/2013
EP     2939795 A2    11/2015

OTHER PUBLICATIONS

U.S. Appl. No. 14/252,997, filed 2014, Lagally et al.
"European Application No. 15196745.2, Search Report mailed Jun. 16, 2016", 11 pgs.

*Primary Examiner* — Ian Jen
(74) *Attorney, Agent, or Firm* — Kwan & Olynick LLP

(57) ABSTRACT

Systems, methods, and devices are disclosed for predictive shimming of large structures. Systems may include a remote device configured to move along a first path relative to a first vehicle structure. The remote device may be configured to move a sensor device along a plurality of measurement points included in the first path. A base device may be configured to identify a position of the sensor device at each measurement point. The base device may be configured to generate measurement data including a first plurality of measurements identifying at least one structural dimension of a first surface of the first vehicle structure. A controller may be configured to control operation of the base device and the remote device based on engineering data associated with the first vehicle structure. The controller may be further configured to determine at least one shim dimension associated with the first surface.

20 Claims, 11 Drawing Sheets

(51) Int. Cl.
*G01C 15/00* (2006.01)
*G01C 15/06* (2006.01)
*G01S 17/66* (2006.01)
*G05B 19/401* (2006.01)
*B64F 5/00* (2006.01)

(56) References Cited

U.S. PATENT DOCUMENTS

| | | | | |
|---|---|---|---|---|
| 4,850,763 A * | 7/1989 | Jack | ................ | B23Q 35/02 |
| | | | | 408/88 |
| 4,940,382 A * | 7/1990 | Castelain | ............... | B62D 57/00 |
| | | | | 114/222 |
| 5,351,626 A * | 10/1994 | Yanagisawa | ......... | B62D 57/032 |
| | | | | 180/164 |
| 5,468,099 A * | 11/1995 | Wheetley | ................ | B23B 39/04 |
| | | | | 180/8.1 |
| 5,920,394 A * | 7/1999 | Gelbart | .................. | G01S 17/66 |
| | | | | 356/615 |
| 6,779,272 B2 * | 8/2004 | Day | ...................... | B64F 5/0009 |
| | | | | 29/407.01 |
| 6,843,328 B2 * | 1/2005 | Boyl-Davis | ............. | B23Q 1/26 |
| | | | | 173/31 |
| 6,926,094 B2 * | 8/2005 | Arntson | .................. | B23B 39/18 |
| | | | | 173/31 |
| 7,273,333 B2 * | 9/2007 | Buttrick, Jr. | ......... | B23Q 9/0042 |
| | | | | 408/1 R |
| 7,406,758 B2 * | 8/2008 | Jones | .................. | B23Q 9/0014 |
| | | | | 248/205.5 |
| 7,614,154 B2 * | 11/2009 | Cobb | .................... | B64F 5/0009 |
| | | | | 33/1 BB |
| 8,655,480 B1 * | 2/2014 | Odendahl | ............... | B24B 19/22 |
| | | | | 451/259 |
| 8,756,792 B2 * | 6/2014 | Boyl-Davis | ...... | G05B 19/40931 |
| | | | | 244/131 |
| 8,790,050 B2 * | 7/2014 | Marguet | .................. | B21J 15/14 |
| | | | | 408/1 R |
| 8,813,382 B1 | 8/2014 | Buttrick | | |
| 2002/0066192 A1 * | 6/2002 | Cunningham | ........ | G01B 11/002 |
| | | | | 33/286 |
| 2005/0172470 A1 * | 8/2005 | Cobb | ............... | G05B 19/41805 |
| | | | | 29/407.1 |
| 2006/0108470 A1 * | 5/2006 | McCrary | ............... | B62D 55/062 |
| | | | | 244/50 |
| 2007/0029877 A1 * | 2/2007 | Longley | ................... | B65G 7/02 |
| | | | | 305/120 |
| 2008/0077276 A1 * | 3/2008 | Montero Sanjuan | .... | B21J 15/14 |
| | | | | 700/245 |
| 2009/0100791 A1 | 4/2009 | Kayani et al. | | |
| 2009/0112349 A1 * | 4/2009 | Cobb | .................... | B64F 5/0009 |
| | | | | 700/114 |
| 2011/0054694 A1 * | 3/2011 | Munk | ..................... | B25B 11/02 |
| | | | | 700/275 |
| 2011/0178727 A1 * | 7/2011 | Hafenrichter | ....... | G01M 5/0016 |
| | | | | 702/38 |
| 2012/0014759 A1 * | 1/2012 | Sarh | ..................... | B62D 57/024 |
| | | | | 408/76 |
| 2013/0158697 A1 * | 6/2013 | Stone | .................. | B64F 5/0009 |
| | | | | 700/114 |
| 2014/0303764 A1 | 10/2014 | Boyl-Davis et al. | | |
| 2014/0365061 A1 * | 12/2014 | Vasquez | ................ | G05D 1/021 |
| | | | | 701/23 |

\* cited by examiner

SYSTEMS, METHODS, AND APPARATUS FOR AUTOMATED PREDICTIVE SHIMMING FOR LARGE STRUCTURES

TECHNICAL FIELD

This disclosure generally relates to vehicles and machinery and, more specifically, to shimming systems implemented with such vehicles and machinery.

BACKGROUND

In a manufacturing or assembly environment, spaces or gaps may often exist between two or more components or structures that are to be coupled to each other. For example, in a large structure, such as an airplane wing, gaps of varying magnitudes may exist between components of the wing, such as an internal structural component such as a rib, and an external or surface component such as a top or bottom surface of the wing. Shims may be used to fill gaps between components or structures at an interface to ensure proper mechanical coupling between the parts that are to be coupled. A shim may be a relatively thin piece of a material, such as metal, which is inserted into the gap to fill the gap and achieve acceptable mechanical coupling between structures. However, conventional techniques for implementing shims remain limited because they are not able to efficiently and effectively determine dimensions that may be used to create shims for large structures.

SUMMARY

Systems, method, and devices for manufacturing, using, and otherwise implementing automated shimming for large structures are disclosed herein. Systems as disclosed herein may include a remote device that may be configured to move along a first path relative to a first structure and, where the remote device may be further configured to move a sensor device along a plurality of measurement points included in the first path. The systems may also include a base device communicatively coupled to the remote device and configured to identify a position of the sensor device of the remote device at each measurement point of the plurality of measurement points. The base device may be further configured to generate measurement data identifying at least one structural dimension of a first surface of the first structure. The systems may further include a controller device communicatively coupled to each of the base device and the remote device. The controller device may be configured to control operation of the base device and the remote device and further configured to determine at least one shim dimension associated with the first surface of the first structure based, at least in part, on the measurement data.

In some embodiments, the sensor device includes a tracking ball and a reflective device coupled to the tracking ball. The base device may include a tracking device configured to be optically coupled with the reflective device. Furthermore, according to some embodiments, the tracking ball may be configured to mechanically couple with the first surface responsive to being within a designated distance of the first surface. The mechanical coupling between the tracking ball and the first surface may cause at least one change in a position of the tracking ball, and the tracking device may be configured to identify the change. According to some embodiments, the tracking ball may be coupled to a housing of the sensor device via a mechanical arm, where the mechanical arm is configured to determine a position of the tracking ball. In various embodiments, the first surface of the first structure is included in an interface with a second surface of a second structure, and the measurement data may also include a first plurality of measurements associated with the first surface and a second plurality of measurements associated with the second surface.

In some embodiments, the shim dimension is determined based, at least in part, on the first plurality of measurements and the second plurality of measurements. According to various embodiments, the base device is configured to move along a second path relative to the first structure, and the movement of the base device may be based, at least in part, on metrology data identifying a first position of the first structure and a second position of the base device in an assembly environment. In some embodiments, movement of the remote device is based, at least in part, on engineering data. In various embodiments, the controller device is further configured to update the engineering data based on the generated measurement data. According to some embodiments, the first structure is a component of a wing of an airplane.

Also disclosed herein are methods that may include moving a remote device along a first path relative to a first structure, where the first path is identified based on engineering data identifying a plurality of structural dimensions of the first structure. The methods may further include generating a first plurality of measurements along the first path, where the first plurality of measurements are associated with a first plurality of measurement points along the first path, and the first plurality of measurements identify at least one structural dimension of a first surface of the first structure. The methods may also include generating measurement data based on the first plurality of measurements, where the measurement data is generated by a base device communicatively coupled to the remote device. The methods may further include determining at least one shim dimension associated with the first surface of the first structure based on the measurement data.

In some embodiments, the generating of the measurement data may further include receiving, at the base device, the first plurality of measurements from a sensor device included in the remote device, where the remote device includes a tracking ball and a reflective device. In various embodiments, the base device includes a tracking device, and the receiving the first plurality of measurements further includes measuring at least one position of the tracking ball via the tracking device. In some embodiments, the methods further include updating the engineering data based on the generated measurement data. According to various embodiments, the first surface of the first structure is included in an interface with a second surface of a second structure. The methods may also include generating a second plurality of measurements along a second path relative to the first structure, where the second plurality of measurements are associated with a second plurality of measurement points along the second path. The generated measurement data may include the second plurality of measurements associated with the second surface of the second structure. Furthermore, the shim dimension may be determined based, at least in part, on the first plurality of measurements and the second plurality of measurements. In some embodiments, the first structure is a component of a wing of an airplane.

Also disclosed herein are devices that may include a first communications interface configured to communicate with a remote device configured to move along a first path relative to a first structure, where the remote device is further configured to move a sensor device along a first plurality of measurement points included in the first path. The devices may also include a second communications interface configured to communicate with a base device, where the base device is configured to identify a position of the sensor device of the remote device at each measurement point of the plurality of measurement points. The base device may be further configured to generate measurement data identifying at least one structural dimension of a first surface of the first structure. The devices may also include a controller configured to control movement of the base device and the remote device via the first and second communications interfaces, and further configured to determine at least one shim dimension associated with the first surface of the first structure, where the at least one shim dimension is determined based on the measurement data.

In some embodiments, the first surface of the first structure is included in an interface with a second surface of a second structure. Moreover, the measurement data may further include a first plurality of measurements associated with the first plurality of measurement points along the first path and a second plurality of measurements associated with the second surface of the second structure, and the controller may be configured to determine the shim dimension based, at least in part, on the first plurality of measurements and the second plurality of measurements. In various embodiments, the first structure is a component of a wing of an airplane.

While numerous embodiments have been described to provide an understanding of the presented concepts, the previously described embodiments may be practiced without some or all of these specific details. In other instances, well known process operations have not been described in detail so as to not unnecessarily obscure the described concepts. While some concepts have been described in conjunction with the specific examples, it will be understood that these examples are not intended to be limiting, and other suitable examples are contemplated within the embodiments disclosed herein.

DETAILED DESCRIPTION

Figure 1A:
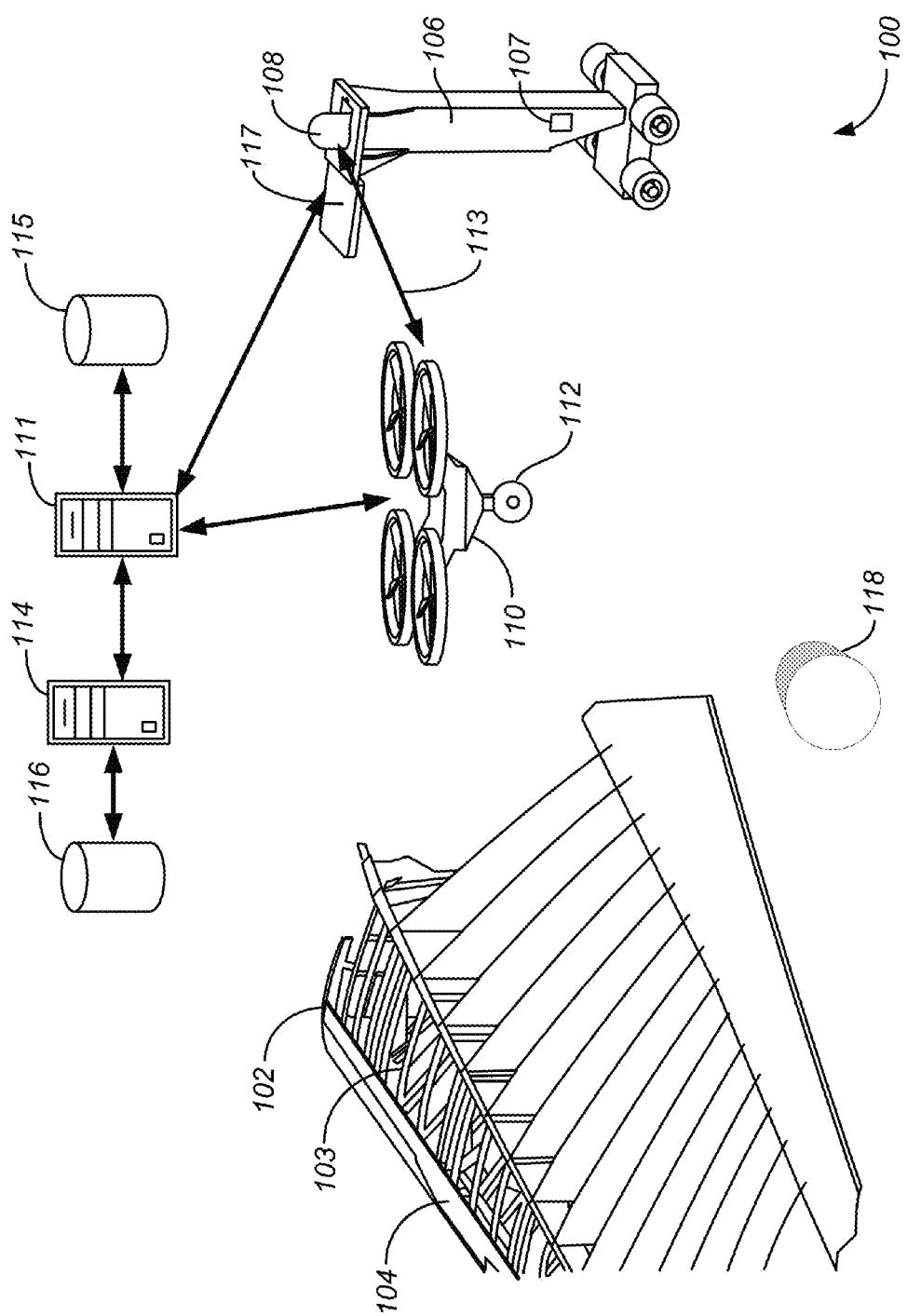
FIG. 1A illustrates a diagram of an example of an automated shimming system, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Conventional techniques for implementing shims in a manufacturing or assembly environment remain limited because they are not able to effectively generate the appropriate measurement data for large structures which may be involved in the assembly process. As discussed herein, large structures may include large components which are included in large vehicles. For example, a large structure may be a wing of an airplane, or a component of the wing, such as a surface panel of the wing. Large structures may have dimensions in excess of 100 feet. In the example of an airplane wing, a structure or component may have dimensions of 110 feet by 20 ft. or more. Due to the extensive size of such structures, conventional techniques for implementing shims typically include manual collection of dimensional measurements followed by manual calculation of dimensions of shims based on various different measurements. Such a manual process may be time consuming, could potentially introduce human error, and may utilize a significant portion of floor space in an assembly process.

Various embodiments disclosed herein provide for the automated predictive shimming of large structures. In some embodiments, a remote device, such as a remote drone, may navigate one or more surfaces of a large structure and may collect various measurements that may be used to generate dimensions for all shims required at an interface of the large structure. In various embodiments, the remote device may be communicatively coupled to a base device that may be configured to monitor and track the location of the remote device. In some embodiments, the operation of both the remote device and the base device may be controlled by a controller device. Accordingly, the controller device may guide the remote device and base device along designated paths to obtain measurement data capable of being used to determine the appropriate dimensions for shims for the large structure. In this way, the measurement data may be generated automatically and as a single contiguous acquisition process, thus resulting in the fast and efficient acquisition of data as well as a high level of accuracy in the data itself. Moreover, the measurement data may be integrated with existing engineering data that describes or characterizes specification designs of the structure. Thus, the engineering data may be updated to reflect the most recent and accurate measurement data. As will be described in greater detail below, various embodiments disclosed herein may provide for various other aspects, such as the placement of the shims, the placement of other parts, and/or various other tooling operations such as drilling and/or cleaning.

FIG. 1A illustrates a diagram of an example of an automated shimming system, implemented in accordance with some embodiments. Automated shimming systems as disclosed herein, such as system 100, may be configured to automatically scan and measure various surfaces and interfaces of a large structure and/or components of the large structure to determine the precise dimensions of gaps that may be present at such interfaces, as well as the appropriate dimensions of shims that may be manufactured and used to fill the gaps and ensure proper mechanical coupling among components of the large structure. Furthermore, as will be discussed in greater detail below, system 100 may be further configured to determine that no gap exists and no shim should be manufactured. In this way, system 100 may be implemented to determine the dimensions of the shims efficiently and accurately for any suitable large structure.

As similarly discussed above, an automated shimming system such as system 100 may be implemented with one or more large structures in a manufacturing or assembly environment which may include the assembly of a large vehicle, such as an aircraft. For example, system 100 may be implemented with an airplane wing, such as wing 102. In this example, wing 102 is being assembled from various interior and exterior components such as rib 103 and an exterior surface such as upper panel 104. As similarly discussed above, components such as rib 103 and upper panel 104 may be joined or mechanically coupled at an interface or joint which may include several attachment points. However, at this interface and its associated attachment points, there may be a gap or space between the parts or structures. In some embodiments, there may be several gaps at different locations along the interface between rib 103 and upper panel 104. As will be discussed in greater detail below, various components of system 100 may be configured to automatically determine the appropriate dimensions for shims that may fill the gaps and ensure proper mechanical coupling between rib 103 and upper panel 104.

As illustrated in FIG. 1A, wing 102 is in the process of being assembled, and upon completion would be covered by surface panels. Furthermore, while FIG. 1A illustrates an aircraft wing, system 100 may be implemented with any suitable large structure. For example, system 100 may be implemented with other portions of the aircraft, such as a fuselage section or empennage section. Furthermore, system 100 may be implemented with assembly or manufacturing environments associated with other types of vehicles, such as boats, commercial ships, trains, cars, and trucks.

In various embodiments, system 100 may include remote device 110. According to some embodiments, remote device 110 may be a remotely controlled vehicle capable of free movement in the assembly environment. For example, remote device 110 may include a propulsion system which enables the movement of remote device 110. Moreover, the propulsion system may be movable or configurable to enable six degrees of freedom within the three-dimensional space of the assembly environment. In one example, remote device 110 may be an aerial drone. As discussed in greater detail below with reference to FIG. 2A and FIG. 2B, remote device 110 may be an aerial drone that includes a propulsion system that includes various propulsion devices, such as propellers or thrusters.

In various embodiments, remote device 110 is configured to navigate various measurement paths along a large structure, such as wing 102, or a component of a large structure, such as rib 103. As will be discussed in greater detail below, the paths may be determined or delineated by interfaces between components of the large structure. Accordingly, a path associated with the remote device may represent an interface between components or structures for which measurements should be made to determine the appropriate dimensions of shims for that interface. Moreover, the boundaries of the paths may be determined by controller device 111. In some embodiments, as will be discussed in greater detail below, remote device 110 may be communicatively coupled to controller device 111 via a wireless communications link, or any other suitable communications modality. In various embodiments, remote device 110 may be further configured to sample or obtain several measurements along each path. For example, remote device 110 may be configured to fly along a path which represents an interface between rib 103 and upper panel 104. Remote device 110 may be configured to take various measurements identifying structural dimensions of a surface of rib 103. Accordingly, remote device 110 may include a sensor device, such as sensor device 112, which may be configured to accurately measure a surface topology of a component or structure that is the subject or target of a particular scanning or measurement path. As discussed in greater detail below, sensor device 112 may be a sensor device that mechanically couples with a surface of the large structure, such as a ball or tracking ball. In some embodiments, sensor device 112 may be a sensor device that does not mechanically couple with the surface of the large structure, such as a laser scanning tool.

While various embodiments herein describe a measurement path associated with a large structure such as a wing, and portions of the large structure such as a rib and upper or lower surface or panel, various measurement paths associated with other parts and structures may be implemented as well. For example, measurement paths may be implemented to acquire measurements associated with interfaces between ribs and spars included in a large structure, such as a wing section. Moreover, measurement paths may be implemented to acquire measurements associated with interfaces between spars and upper or lower surfaces or panels of the large structure. Further still, measurement paths may be implemented to acquire measurements associated with joints or interfaces in fuselage sections of an airplane as well as empennage sections.

According to some embodiments, remote device 110 may include various communications interfaces which enable communication with other components of system 100. For example, remote device may include a communications interface that may be configured to transmit and receive data to and from base device 106 and controller device 111. As similarly discussed above, the transmission and reception of data may be via a wireless communications link. In this way, data may be sent to and from remote device 110 thus enabling another component of system 100, such as controller device 111, to control the operation of remote device 110 and control the progression of remote device 110 along a particular scanning path. In various embodiments, the communications interfaces may be wireless communications interfaces, thus enabling wireless communication among components of system 100. Furthermore, according to some embodiments, remote device 110 may further include a power source, such as a battery supply. In various embodiments, remote device 110 may be coupled or tethered to an external power source via a flexible power cable.

While various embodiments, disclosed herein have described remote device 110 within the context of generating measurement data, various other contexts are also disclosed herein. For example, remote device 110 may be configured to carry a payload, such as a part. Thus, remote device 110 may be configured to place parts, such as shims, along a particular path. Furthermore, remote device 110 may be configured to include various tools and may be configured to perform various tooling operations, such as drilling and cleaning. Thus, remote device 110 may be configured to perform tooling operations, such as drilling holes, along a particular path.

System 100 may also include base device 106. In various embodiments, base device 106 may be configured to, among other things, provide various support functionalities for remote device 110. For example, base device 106 may be configured to include support platform 117 upon which remote device 110 may land and take off from to execute a scanning protocol among one or more measurement paths. Furthermore, base device 106 may include a tracking system or device, such as tracking device 108, which may be configured to monitor and record positional data associated with remote device 110. Accordingly, as discussed in greater detail below with reference to FIG. 3, base device 106 may be configured to track a specific position of remote device 110 and log positional data identifying the position or location of remote device 110. As similarly discussed above with reference to remote device 110, base device 106 may include various communications interfaces that enable communication with other components of system 100, such as controller device 111. Furthermore, the communications interfaces included in base device 106 may be wireless communications interfaces, thus enabling wireless communication between components. As discussed in greater detail below, while controller device 111 has been shown as a separate computing device, according to some embodiments, controller device 111 may be included in and integrated with base device 106. Accordingly, controller device 111 may be an internal component of base device 106, and a communications interface might not be included or may be an internal communications bus.

In various embodiments, base device 106 may include its own propulsion system. Accordingly, base device 106 may include a mobile platform capable of movement independent of remote device 110. For example, base device 106 may include several wheels that enable omnidirectional movement along a surface of the assembly or manufacturing environment. In this way, base device may be configured to navigate to various different scanning or measurement locations along a movement path which may circumnavigate a large structure that is being scanned. As will be discussed in greater detail below, base device 106 may navigate to the various different scanning or measurement locations based on available metrology data and/or a determined relationship between base device 106 and one or more landmarks or targets, such as landmark 118. In one example, base device 106 may navigate to a first position along a movement path, launch remote device 110 to obtain measurements along a measurement path, retrieve remote device 110, and subsequently move to a second position along the movement path. In this way, base device 106 may launch remote device 110 to obtain measurements from several different locations around a large structure, such as wing 102.

System 100 may further include controller device 111. In various embodiments, controller device 111 may be a data processing device or system configured to control the operation of other components of system 100, such as remote device 110 and base device 106. While controller device 111 is shown as a separate data processing device, a controller device may be implemented within base device 106 as an on-board component, such as controller device 107. In some embodiments, controller device 111 or 107 may be a data processing device that includes a processing unit and associated storage devices. For example, the processing unit may include one or more central processing units (CPUs) configured to retrieve and analyze various data associated with wing 102, remote device 110, and base device 106, such as engineering data and metrology data. Thus, in some embodiments, the CPU may be an application-specific processor configured or customized for the processing of spatial data associated with large structures. Furthermore, the storage devices may include any hardware component capable of storing information, such as data, program code in functional form, and/or other suitable information either on a temporary basis and/or a permanent basis. The storage devices may include memory which may be, for example, a random access memory or any other suitable volatile or non-volatile storage device. In some embodiments, the storage devices may be persistent and non-transitory storage devices that may include, for example, one or more components or devices such as a hard drive, a flash memory, a rewritable optical disk, or some combination of the above. The storage devices may be configured to store data generated and retrieved by the processing unit. It will be appreciated that while many features are subsequently described with reference to controller device 111, embodiments including controller device 107 are configured to have similar features as well.

Accordingly, controller device 111 may be configured to receive positional data from base device 106, determine a measurement path for remote device 110, as well as generate and provide command and control data to remote device 110 that configures remote device 110 to follow the measurement path. In some embodiments, controller device 111 may be configured to determine the measurement path based, at least in part, on engineering data associated with the large structure that is being scanned.

In some embodiments, the engineering data may be previously generated design or schematic data. For example, the engineering data may include various three-dimensional data derived from a computer-assisted design (CAD) model of the large structure. The engineering data may be retrieved by controller device 111, and controller device 111 may be configured to generate one or more measurement paths based on the engineering data. For example, controller device 111 may be configured to retrieve engineering data, discussed in greater detail below, and may be further configured to determine or calculate a vector identifying a shortest path between the current location of remote device 110 and each measurement point of several designated measurement points. In some embodiments, the designated measurement points may have been previously identified or flagged by a designer or other worker, and included in the engineering data. Thus, the calculated vector may be a shortest path through three-dimensional space that is generated or configured based on available data about the structure and/or shape of the large structure itself. In this way, the measurement path may be the shortest path available with no blockage of a line of sight between remote device 110 and based device 106 for each measurement point included in the measurement path. According to some embodiments, controller device 111 may be communicatively coupled with a data store such as engineering data store 115 which may be configured to store the engineering data associated with the large structure. In some embodiments, data store 115 may include one or more storage media or a database system. Controller device 111 may be configured to identify and retrieve the relevant engineering data from data store 115.

In various embodiments, controller device 111 may be further configured to generate and provide command and control data to base device 106. For example, controller device 111 may be configured to generate command and control data that configures base device 106 to follow a movement path around a large structure, and complete a scanning protocol at each of several locations along the movement path. In some embodiments, controller device 111 may determine the command and control data associated with the movement path based, at least in part, on metrology data that identifies a position or location of one or more components of system 100 within the assembly or manufacturing environment. In some embodiments, system 100 may include a metrology system or device, such as metrology device 114, which may be configured to monitor and log a position of different components within an assembly environment, which may be a factory or warehouse. For example, metrology device 114 may include at least part of a global positioning system (GPS) which may include a central transmitter. The central transmitter may be configured to communicate with various receivers coupled to components on the factory floor. For example, a first receiver may be included in or coupled with base device 106, and a second receiver may be coupled to or included in wing 102. In this way, metrology device 114 may periodically query the receivers to generate metrology data that includes one or more data values identifying the position of components of system 100, such as base device 106, and wing 102.

In various embodiments, controller device 111 may be configured to identify a movement path and generate the command and control data based, at least in part, on the metrology data. In some embodiments, controller device 111 may generate the movement path and command and control data associated with the movement path based on available engineering data as well as metrology data. For example, as previously discussed, controller device 111 may generate a measurement path based designated measurement points included in engineering data that defines, describes, or otherwise characterizes the structure of a large structure, such as wing 102. In this example, controller device 111 may be configured to determine that, for a particular measurement path or set of designated measurement points, base device 106 should be moved to establish a line of sight with the measurement path. Controller device 111 may be configured to determine the ideal position of base device 106 based on the engineering data. For example, based on the CAD model data included in the engineering data, controller device 111 may identify a position or location that has an unobstructed line of sight with each designated measurement point in a particular measurement path. Controller device 111 may be further configured to determine the current location of base device 106 based on metrology data, and determine a shortest path between the current location of base device 106 and the determined ideal location. The shortest path may be used as a movement path. In various embodiments, metrology device 114 may be communicatively coupled with a data store such as metrology data store 116 which may be configured to store the metrology data associated with the large structure and the manufacturing environment. In some embodiments, data store 116 may include one or more storage media or a database system.

According to some embodiments, controller device 111 may be further configured to determine dimensions of shims based on the measurement data generated by base device 106 and remote device 110. As will be discussed in greater detail below with reference to FIG. 1B and FIG. 5, controller device 111 may be configured to compare measurement data of a first surface, which may be rib 103, with measurement data of a second surface, which may be upper panel 104, and/or the engineering data to determine a distance between the first and second surface, and further determine an appropriate thickness of a shim that should be placed between the first surface and the second surface. In this way, controller device 111 may be configured to retrieve and process various data from system 100 to determine dimensions of shims for each gap in each interface that has been scanned.

While FIG. 1A illustrates system 100 as including a single remote device and a single base device, various embodiments disclosed herein disclose the use of numerous remote devices and numerous base devices. For example, during the acquisition of measurement data for a large structure, such as wing 102, several remote devices and several base devices may be used to scan different measurement paths simultaneously. Moreover, a single controller device may control the operation of the multiple based devices and their associated remote devices. Further still, several controller devices may be implemented in tandem to control the multiple base devices and their associated remote devices to acquire measurement data for a structure.

Figure 1B:
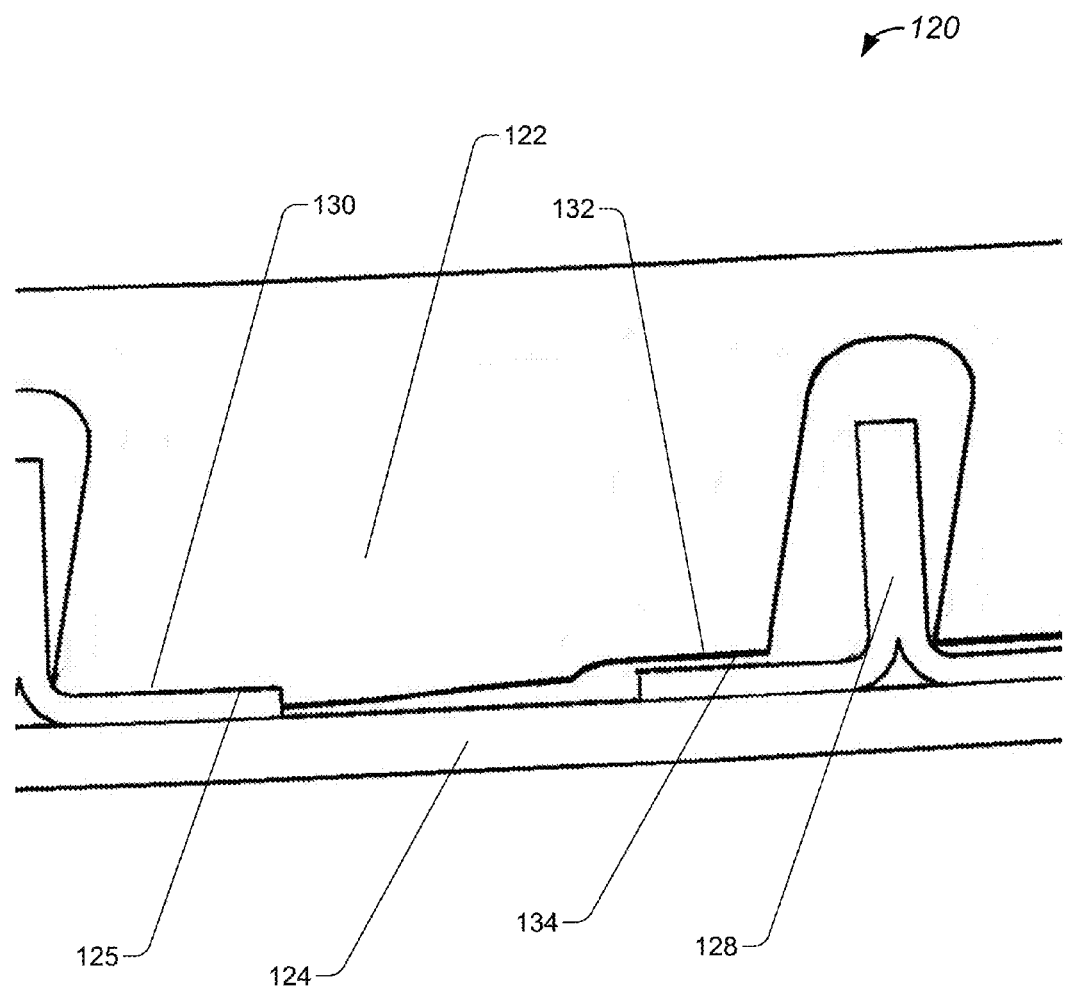
FIG. 1B illustrates a diagram of an example of an interface between structures, implemented in accordance with some embodiments.

FIG. 1B illustrates an example of an interface between structures, implemented in accordance with some embodiments. As similarly discussed above, an interface may exist between two structures in an assembly environment, such as assembly environment 120. For example, first structure 122 may be coupled to second structure 124 via an interface, such as interface 125. In some embodiments, first structure 122 and second structure 124 may be components or structures included in a large vehicle structure, such as an airplane wing. For example, first structure 122 may be an internal component, such as a rib, and second structure 124 may be a lower surface of the airplane wing.

In various embodiments, surfaces that form interface 125 may include several structural features configured to provide increased coupling between first structure 122 and second structure 124, as well as additional structural support for each respective structure. For example, second structure 124 may be coupled to several structural members which may be longerons, stiffeners, or stringers, such as stringer 128, which may attached or coupled to an internal surface of second structure 124 which, in this example, may be the lower surface of an airplane wing. Moreover, first structure 122 may include several portions or areas which may be configured to conform to and couple with the stringers. Accordingly, interface 125 may be defined by the coupling between first structure 122 and second structure 124, as well as the surfaces and stringers of each respective structure.

As shown in FIG. 1B, first portion 130 of interface 125 may be flush and may have no gap or distance between first structure 122 and second structure 124. However, other portions, such as second portion 132 may not be flush and may have a gap or space, such as gap 134. As similarly discussed above, to ensure sufficient coupling between first structure 122 and second structure 124, gap 134 may be filled with a shim that is configured to fill gap 134 with a material, such as metal. As will be discussed in greater detail below, one or more system components may be configured to utilize remote devices and sensor devices to measure dimensions and features of first structure 122 and second structure 124, and may be further configured to determine shim dimensions to fill any gaps between the two structures. Moreover, one or more system components may be further configured to manufacture the shims and place them in the gaps to ensure mechanical coupling between the structures.

Figure 2A:
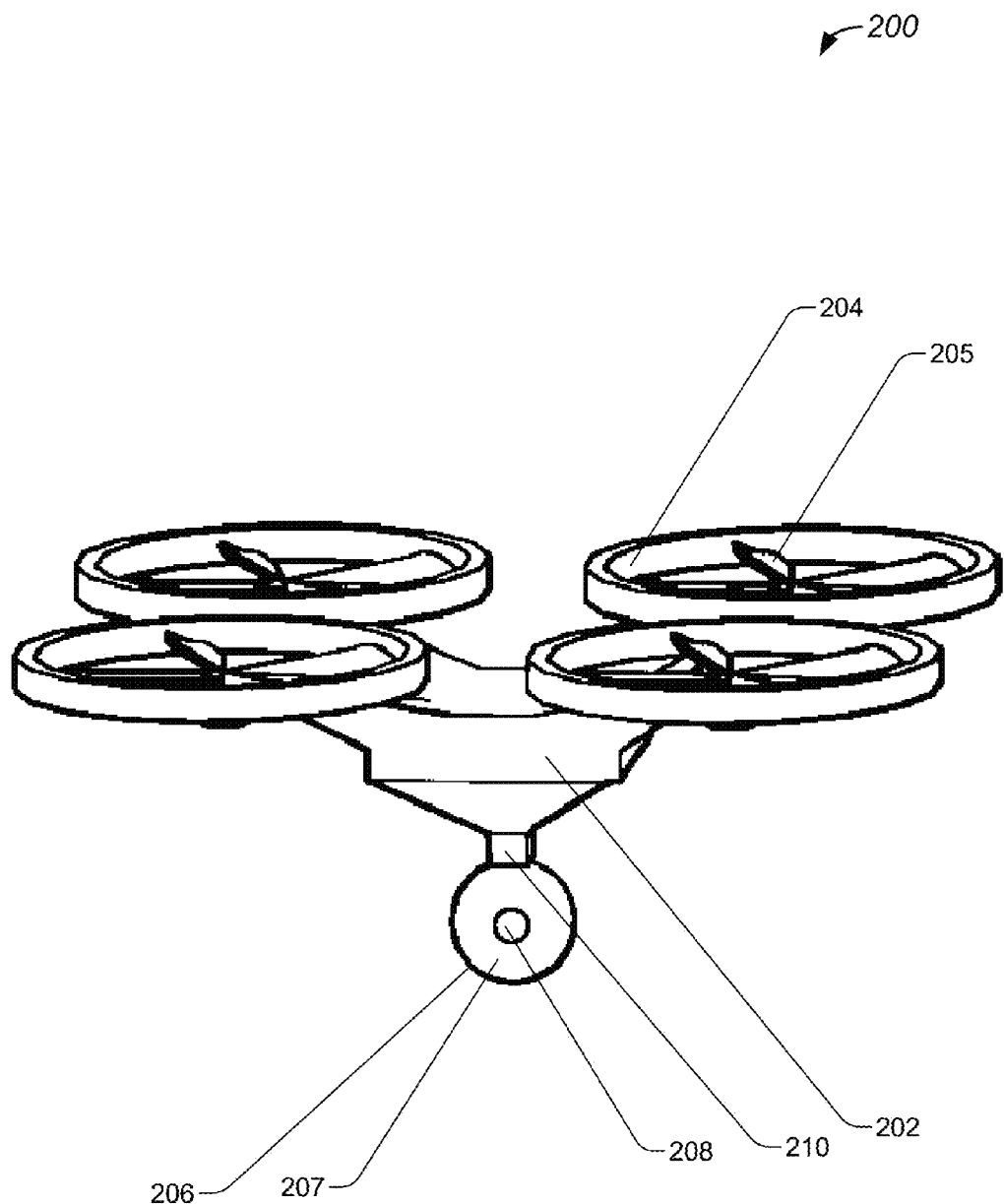
FIG. 2A illustrates a diagram of an example of a remote device as described in FIG. 1A, implemented in accordance with some embodiments.

FIG. 2A illustrates a diagram of an example of a remote device as described in FIG. 1A, implemented in accordance with some embodiments. As similarly discussed above, remote device 200 may be configured to navigate one or more measurement paths corresponding to components of a large structure to obtain several measurements of the surface of the components. As shown in FIG. 2A, remote device 200 may include a housing, such as housing 202 which may provide structural support for various components of remote device 200 and may house various components as well, such as wireless communications interfaces and control software and hardware.

In various embodiments, remote device 200 may further include various propulsion devices, such as propulsion device 204, which may be configured to generate lift and rotate in orientation to provide remote device six degrees of freedom when moving through three-dimensional space. In some embodiments, propulsion device 204 may include a propeller, such as propeller 205. As shown in FIG. 2A, remote device 200 includes four propulsion devices, but any suitable number may be used. For example, remote device 200 may be configured to include two propulsion devices or even six propulsion devices.

According to some embodiments, remote device 200 may include a sensor device 206 which may be configured to generate one or more measurements of a surface of a large structure. For example, sensor device 206 may include ball 207 that freely rotates around an axis of motion. Ball 207 may further include reflective device 208 which may be a reflective prism or a cluster of mirrors. In various embodiments, reflective device 208 may be configured to reflect a laser beam that may originate from a tracking device included in a base device associated with remote device 200. Thus, as discussed in greater detail below with reference to FIG. 3, the laser tracking system of the base device may be configured to monitor a location of reflective device 208. If sensor device 206 is in contact with a surface of a large structure, a controller or controller device may be configured to use a known radius of ball 207 to calculate a position of the surface itself, and obtain a measurement at that position. In some embodiments, ball 207 may be made of any suitable lightweight material and may have a diameter of between about 1 inch and 1.5 inches. In some embodiments, ball 207 may have a smaller diameter for more detailed measurements and feature scanning and/or for smaller operational spaces and areas. For example, ball 207 may have a diameter of about 0.5 inches.

In various embodiments, sensor device 206 may be coupled to housing 202 via coupling device 210 which may be configured to enable removable coupling between sensor device 206 and housing 202. For example, coupling device 210 may include a latch or magnetic interface including magnets on mating surfaces that allow sensor device 206 to be coupled to housing 202 or removed from housing 202. Moreover, coupling device 210 may include a compressible portion that is configured to be partially compliant in a particular axis of motion. In various embodiments, coupling device 210 may include a linear bearing and spring configured to have a compliance or spring constant sufficient to maintain physical or mechanical coupling with a surface of the large structure when measurements are being acquired. In some embodiments, coupling device 210 may include an elastic material such as a rubber-band or foam rubber. In various embodiments, coupling device 210 may include a telescoping mechanism such as a four-bar-linkage. Thus, pressure applied to sensor device 206 which may occur, for example, as a result of contact with a surface of a structure, may temporarily cause compression of the compressible portion and movement of sensor device 206 relative to housing 202. The compression may be terminated and sensor device 206 may return to a resting position when contact with the surface is no longer present.

While FIG. 2A illustrates one example of remote device 200 that includes one ball, various embodiments disclosed herein disclose the use of numerous balls. For example, sensor device 206 may include two balls or three balls which may each include a reflective device capable of being monitored and tracked to generate measurement data. Accordingly, coupling device 210 may be configured to couple numerous balls to housing 202.

Figure 2B:
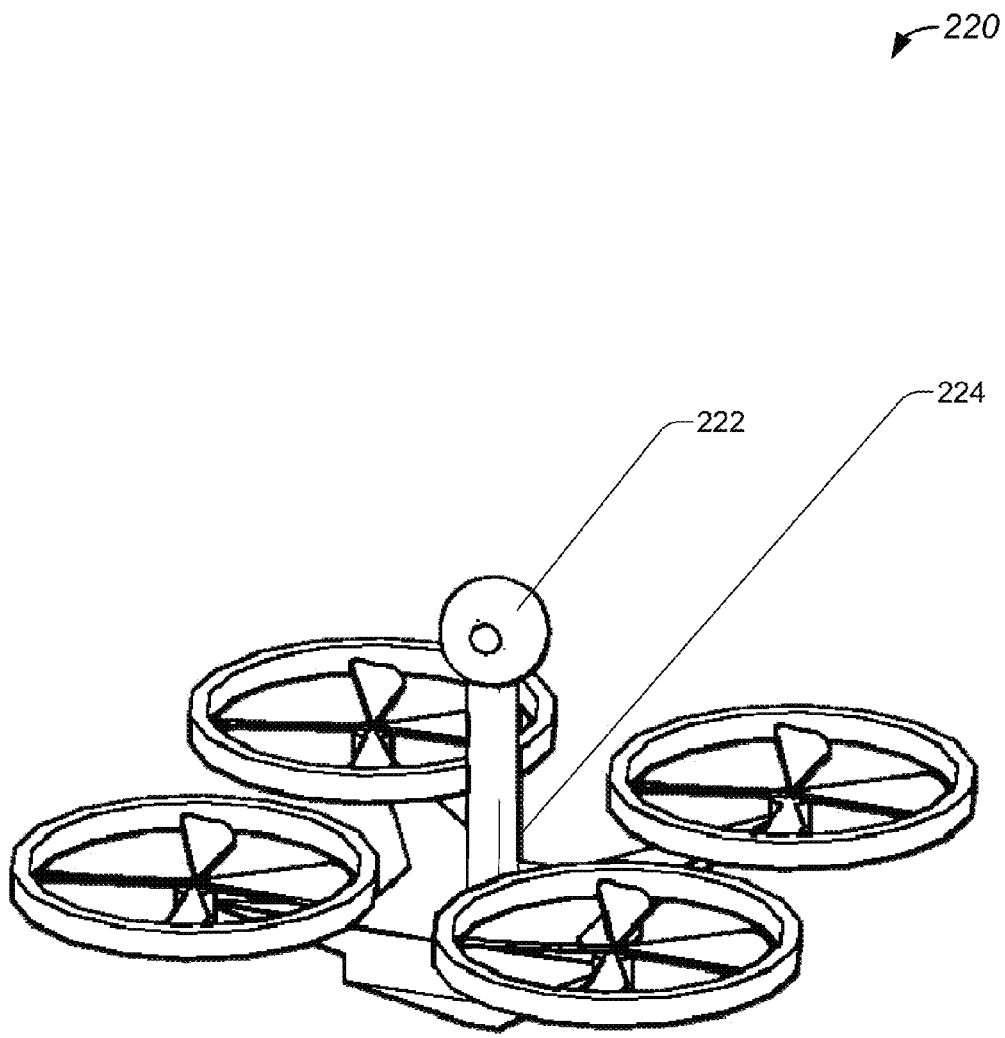
FIG. 2B illustrates a diagram of another example of a remote device as described in FIG. 1A, implemented in accordance with some embodiments.

FIG. 2B illustrates a diagram of another example of a remote device as described in FIG. 1A, implemented in accordance with some embodiments. As similarly discussed above, remote device 220 may be configured to navigate one or more measurement paths corresponding to interfaces of components of a large structure to obtain several measurements of the surface of the components. As similarly discussed above with reference to FIG. 2A, remote device 220 may include a housing, propulsion devices, and a sensor device, such as sensor device 222. As shown above in FIG. 2A, a sensor device may be coupled to the underside of a remote device. When configured in this way, the remote device may be configured to obtain measurements of a surface that is beneath the remote device, which may be, for example, when the remote device is hovering or flying over a top surface of an exposed rib. However, as shown in FIG. 2B, a sensor device may also be coupled to the top side of a remote device, such as remote device 220. When configured in this way, remote device 220 may be configured to obtain measurements of a surface that is above remote device 220, such as a bottom surface of the rib. As shown in FIG. 2B, remote device 220 may include coupling device 224 which, as similarly discussed above with reference to coupling device 210, may provide removable coupling and compliance between the housing of remote device 220 and sensor device 222.

Moreover, as discussed in greater detail below, coupling device 224 may be coupled to a rotating mechanism that extends around a portion of the housing of remote device 220. For example, a rotating collar may extend around a center point of the housing and may be configured to rotate 360 degrees. When configured in this way, the angular position of sensor device 222 relative to the housing may be changed dynamically to adjust to component surfaces that may have varying orientations.

Figure 2C:
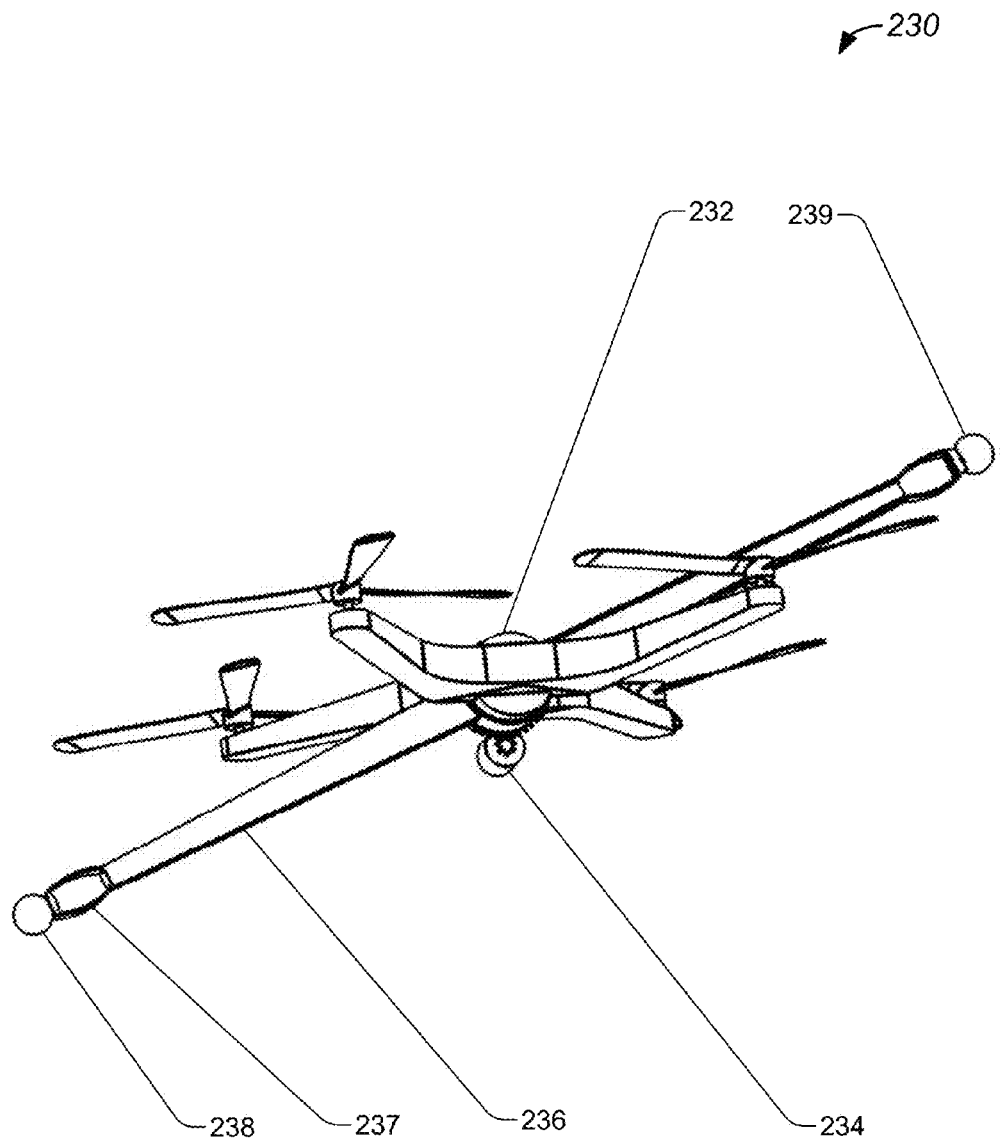
FIG. 2C illustrates a diagram of an example of a remote device as described in FIG. 1A having a rotatable arm, implemented in accordance with some embodiments.

FIG. 2C illustrates a diagram of an example of a remote device as described in FIG. 1A having a rotatable arm, implemented in accordance with some embodiments. As similarly discussed above, a remote device, such as remote device 230, may include a rotating mechanism, such as rotating mechanism 232, that may be configured to change the position of a sensor device, such as sensor device 238. In some embodiments, rotating mechanism 232 may be configured to rotate in response to one or more inputs received at remote device 230 from a base unit and/or controller device. For example, rotating mechanism 232 may include one or more mating geared parts, such as a first geared wheel and a second geared wheel. The second geared wheel may be coupled to a mechanical device configured to rotate the second geared wheel, such as servo actuator 234.

Thus, rotation of the second geared wheel caused by servo actuator 234 may cause the first geared wheel to rotate. In some embodiments, the first geared wheel may be coupled to one or more other components, such as mechanical arm 236, and may cause mechanical arm 236 to rotate. In this way, a position of a coupling device, such as coupling device 237, and sensor device 238 which may be coupled to mechanical arm 236, may be changed or modified to scan different surfaces having different orientations. Furthermore, remote device 230 may further include sensor device 239 which may be a second sensor device, or may be a counter weight configured to balance a load associated with sensor device 238.

Figure 2D:
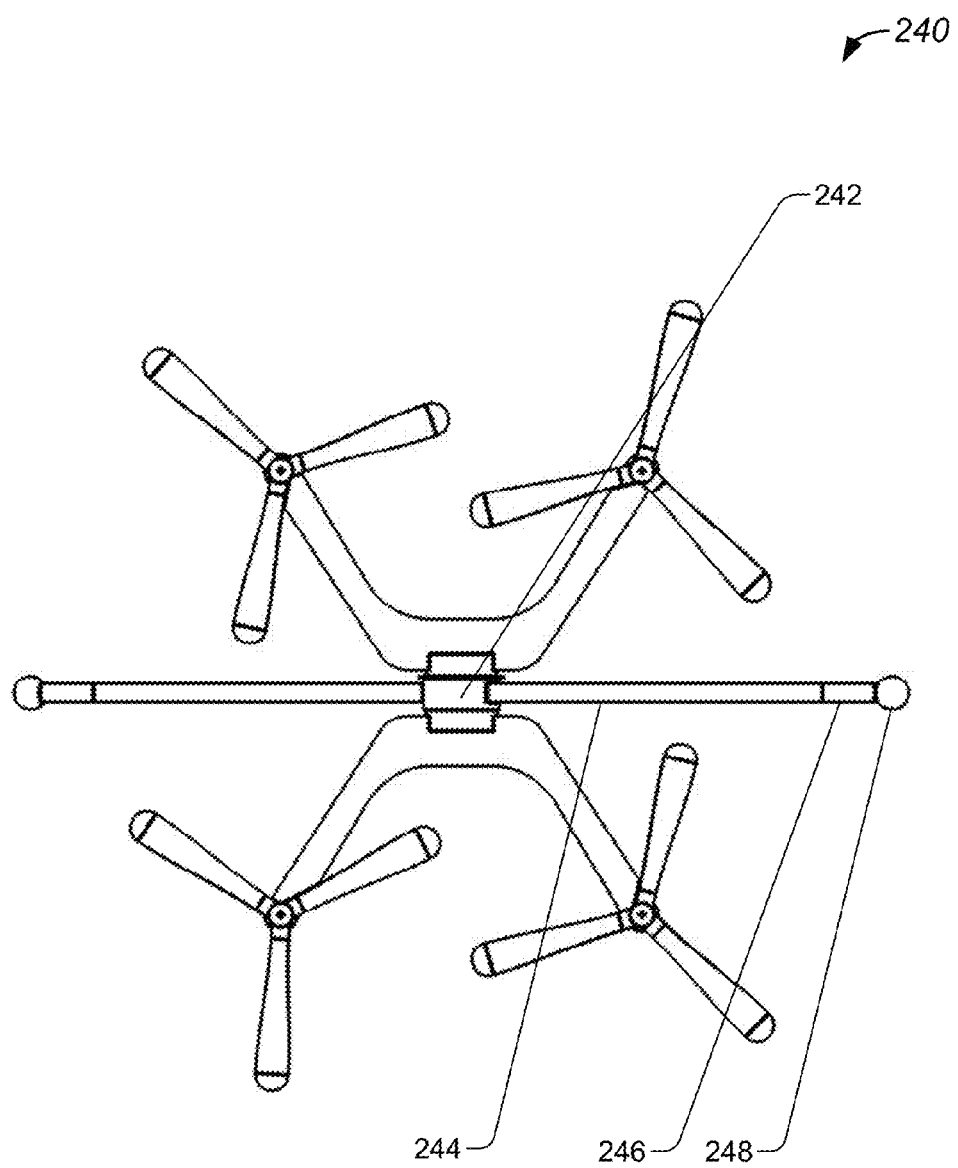
FIG. 2D illustrates a diagram of another example of a remote device as described in FIG. 1A having a rotatable arm, implemented in accordance with some embodiments.

FIG. 2D illustrates a diagram of another example of a remote device as described in FIG. 1A having a rotatable arm, implemented in accordance with some embodiments. As similarly discussed above with reference to FIG. 2C, remote device 240 may include rotating mechanism 242 which may be coupled to mechanical arm 244. In some embodiments, mechanical arm 244 may be coupled to coupling device 246 and sensor device 248. In some embodiments, rotating mechanism 242, mechanical arm 244, and sensor device 248 may be oriented in a first orientation. When configured in the first orientation, sensor device 248 may be configured to scan surfaces that may be in front of and/or behind remote device 240. Accordingly, when in the first orientation, remote device 240 may be configured to scan surfaces that may have a relatively vertical orientation, such as a vertical stabilizer of an empennage section of an airplane.

Figure 2E:
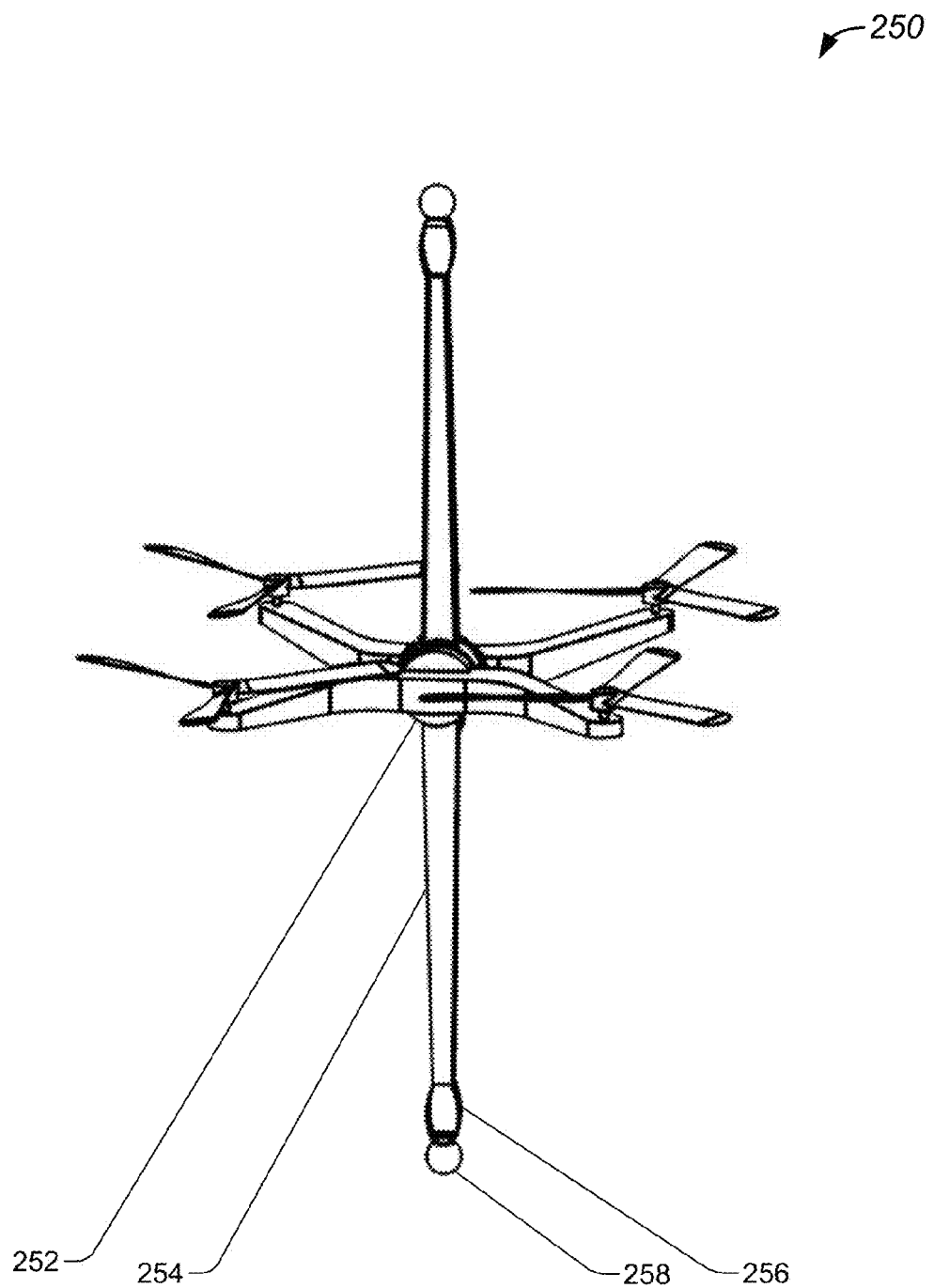
FIG. 2E illustrates a diagram of yet another example of a remote device as described in FIG. 1A having a rotatable arm, implemented in accordance with some embodiments.

FIG. 2E illustrates a diagram of yet another example of a remote device as described in FIG. 1A having a rotatable arm, implemented in accordance with some embodiments. As similarly discussed above with reference to FIG. 2C, remote device 250 may include rotating mechanism 252 which may be coupled to mechanical arm 254. As similarly discussed above, mechanical arm 254 may be further coupled to coupling device 256 and sensor device 258. In some embodiments, rotating mechanism 252, mechanical arm 254, and sensor device 258 may be oriented in a second orientation. When configured in the second orientation, sensor device 258 may be configured to scan surfaces that may be above and/or beneath remote device 250. Accordingly, when in the second orientation, remote device 250 may be configured to scan surfaces that may have a relatively horizontal orientation, such as a horizontal stabilizer of an empennage section, or various surfaces of components of an airplane wing.

Figure 3:
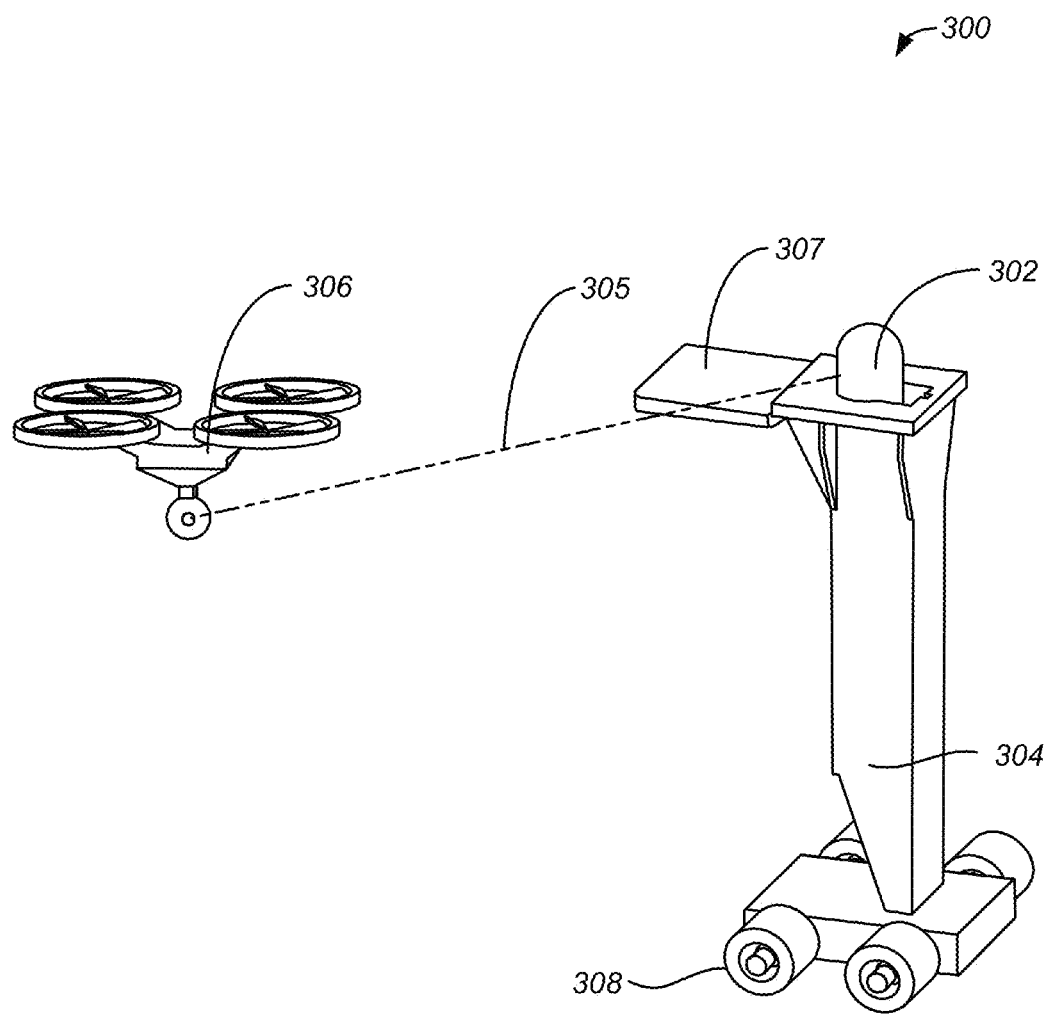
FIG. 3 illustrates a diagram of an example of a base device as described in FIG. 1A, implemented in accordance with some embodiments.

FIG. 3 illustrates a diagram of an example of a base device as described in FIG. 1A, implemented in accordance with some embodiments. As similarly discussed above, an automated shimming system, such as system 300, may include various components, such as base device 304 and remote device 306, which may be configured to acquire measurement data for the manufacture and placement of shims. FIG. 3 illustrates an example of communicative coupling between remote device 306 and base device 304 that enables base device 304 to track the location and position of remote device 306, and generate measurement data based on such tracking FIG. 3 further illustrates a propulsion system, such as base propulsion system 308, which may be configured to move base device 304 along a movement path to different scanning locations. In some embodiments, base propulsion system 308 may include several wheels that may be powered by an on-board power source. Furthermore, base device 304 may include landing platform 307 which may be configured to provide a landing and takeoff point for remote device 306.

In various embodiments, base device 304 may include a tracking device or system such as tracking device 302. In one example, tracking device 302 is a laser tracking device. In various embodiments, the use of a laser tracking device enables long range data acquisition from remote device 306. Furthermore, the use of a laser tracking system enables the payload to be relatively light because just a reflective device is used. Accordingly, tracking device 302 may include a laser and may be configured to move and/or angle the laser responsive to movement of remote device 306 to maintain a line of sight, such as line of sight 305, between the laser and a reflective device included in remote device 306. Based on the angle and elevation of the laser as well as range information, tracking device 302 may generate positional data that identifies where in a coordinate system remote device 306 is relative to base device 304. Thus, positional data identifying the position of remote device 306 may be referenced to the position of base device 304.

Furthermore, in some embodiments, base device 304 may be further configured to reference its own position or location based on available metrology data and a relationship between base device 304 and one or more landmarks or targets included in the assembly environment. For example, base device 304 may be configured to determine a distance between base device 304 and several targets placed within the assembly environment at predetermined known locations. In some embodiments, base device 304 may determine such distances by using range information that may be provided by tracking device 302. Based on the relative distances between base device 304 and the targets, base device 304 may determine, by for example triangulation, its location within the assembly environment. In some embodiments, the targets or landmarks may be used to establish a general or rough approximation of a location, and such a position may be refined based on detailed feature information received from remote device 306. For example, remote device 306 may scan and identify specific features of the large structure, and base device 304 may be configured to correlate the scanned features with a location identified in the engineering data. Base device 304 may be further configured to infer its own location based on its distance and spatial relationship with the scanned feature. In various embodiments, base device 304 may store and maintain the positional data and/or may transmit this data to a controller device for further analysis. In particular embodiments, the generated positional data may be measurement data when such data is generated during a measurement path at a measurement point, as will be discussed in greater detail below with reference to FIG. 5.

Figure 4:
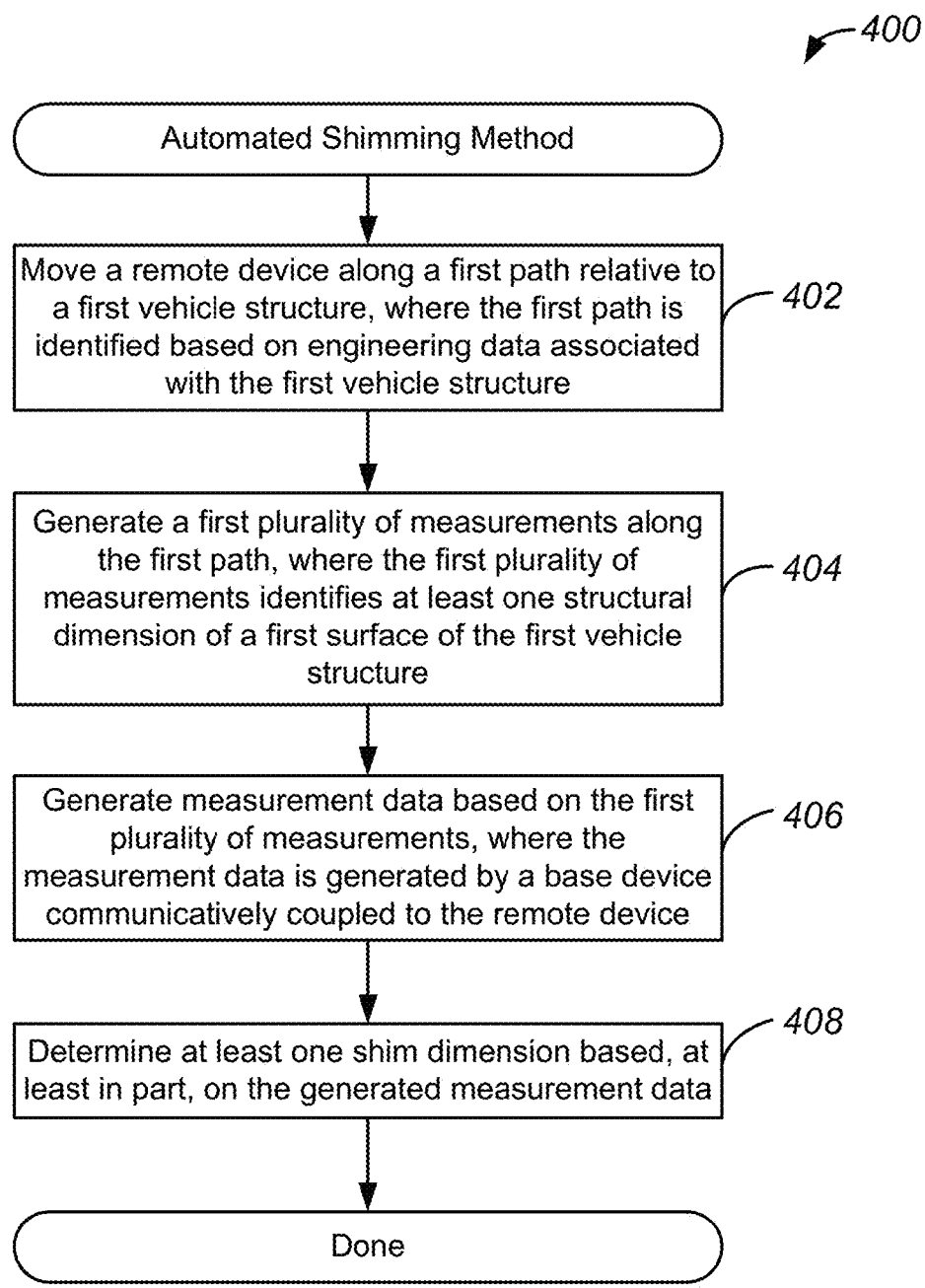
FIG. 4 illustrates a flow chart of an automated shimming method, implemented in accordance with some embodiments.

FIG. 4 illustrates a flow chart of an automated shimming method, implemented in accordance with some embodiments. As similarly discussed above, an automated shimming system may include various components configured to acquire measurement data for the manufacture and placement of shims. Thus, automated shimming systems as disclosed herein may be implemented as part of a data acquisition method or process that may include the collection of measurement data that describes or characterizes gaps between components of a large structure, and the subsequent processing of that measurement data to generate shim dimensions characterizing dimensions of shims that should be manufactured to fill the gaps between components.

Accordingly, method 400 may commence at operation 402, during which a remote device may be moved along a first path relative to a first structure. As similarly discussed above, the first path may be identified based on engineering data associated with the first vehicle structure and may correspond to an interface between components of a large structure, such as a wing of an airplane.

Method 400 may proceed to operation 404, during which a first plurality of measurements may be generated along the first path. In some embodiments, the first plurality of measurements may be associated with a first plurality of measurement points along the first path. Thus, in addition to determining a measurement path for the remote device, a system component, such as a controller device, may identify several measurement points at which measurements should be taken. These measurement points may correspond to particular points along an interface between components that includes the first vehicle structure. For example, the measurement points may correspond to attachment points or locations where fasteners may be used. As previously discussed, the measurement points may be identified based on one or more data values included in the engineering data. In some embodiments, the first plurality of measurements may identify at least one structural dimension of a first surface of the first vehicle structure. Thus, the measurements may identify a depth or height of a particular feature in the surface of the structure as well as its exact location relative to the remote device and its corresponding base device.

Method 400 may proceed to operation 406, during which measurement data may be generated based on the first plurality of measurements. In some embodiments, the measurement data may be generated by a base device that is communicatively coupled to the remote device. Accordingly, the base device may package, in a data object, the measurements acquired during the remote device's scan of the first path. The data object may be stored, or may be transmitted to another system component, such as a controller device, for subsequent analysis.

Method 400 may proceed to operation 408, during which at least one shim dimension associated with the first surface of the first vehicle structure may be determined. In some embodiments, the at least one shim dimension may be determined by the controller device, and may be determined based, at least in part, on the measurement data. As will be discussed in greater detail below with reference to FIG. 5, the controller device may compare the received measurement data to other measurement data or to existing engineering data to identify measurement points that have gaps. The controller device may then calculate the appropriate dimensions of shims for each measurement point that is determined to have a gap.

Figure 5:
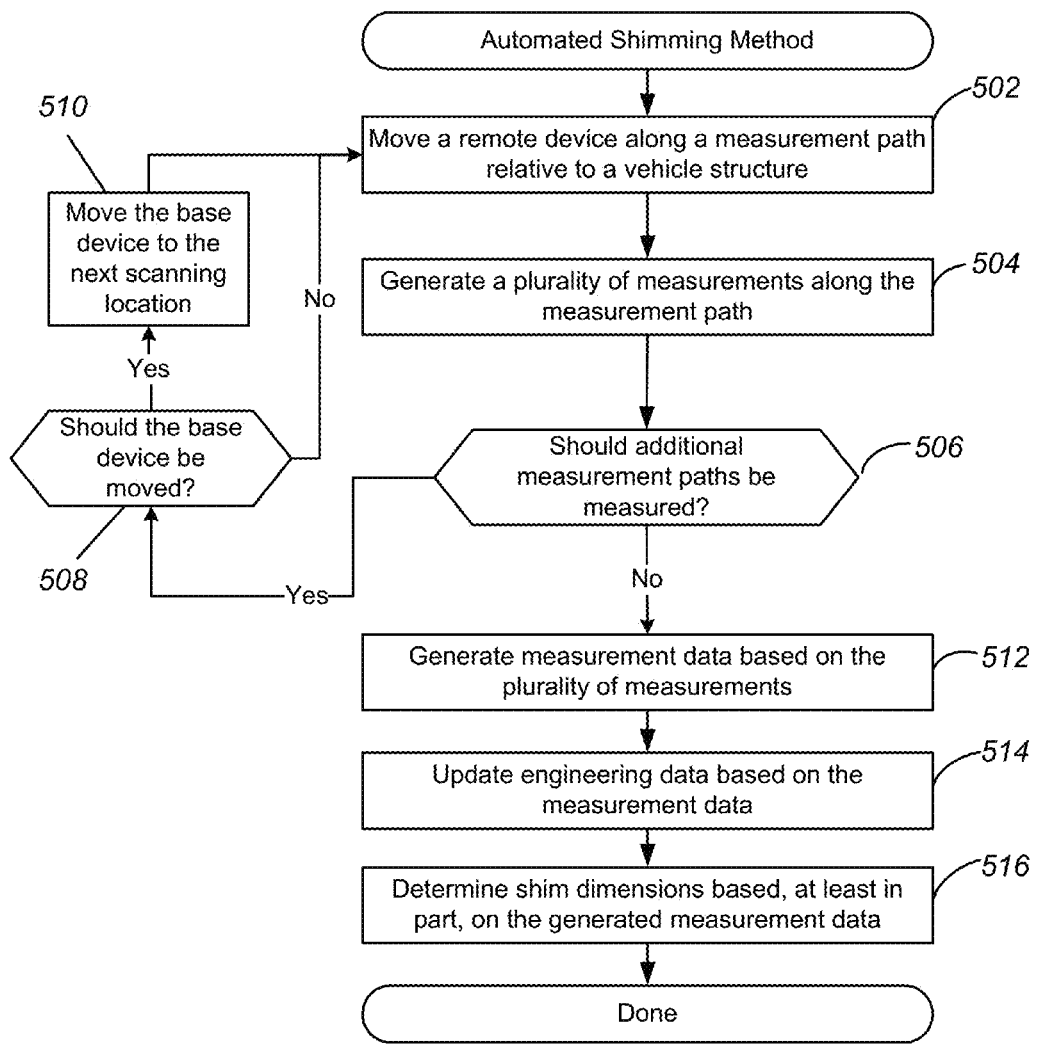
FIG. 5 illustrates a flow chart of another automated shimming method, implemented in accordance with some embodiments.

FIG. 5 illustrates a flow chart of another automated shimming method, implemented in accordance with some embodiments. As similarly discussed above, an automated shimming system may include various components configured to acquire measurement data for the manufacture and placement of shims. In various embodiments, measurement data may be acquired for numerous different measurement paths from numerous different scanning locations. Thus, a data acquisition method or process may include the collection of measurement data that describes or characterizes gaps between interfaces between several or all components of a large structure. In this way, all measurement data utilized for the production of shims for a large structure may be collected in a single data acquisition process or method.

Accordingly, method 500 may commence with operation 502 during which a remote device may be moved along a measurement path relative to a vehicle structure. As similarly discussed above with reference to FIG. 4, the path may be identified based on engineering data associated with the vehicle structure and may correspond to an interface between components of a large structure. In various embodiments, the path may be identified by a controller device, and command and control data may be transmitted to the remote device to control the movement of the remote device along the measurement path currently being scanned.

Method 500 may proceed to operation 504 during which a plurality of measurements may be generated along the measurement path. As similarly discussed above, the plurality of measurements may be associated with a plurality of measurement points which may be determined by the controller device. In some embodiments, the measurement points may be designated points at which the remote device pauses and stabilizes itself to eliminate errors that might otherwise be introduced by motion of the remote device. Accordingly, a measurement may be made at each measurement point in which the base device records the position of the remote device and the sensor device that may be attached or coupled to the remote device.

As previously discussed above, the sensor device may be a ball, such as a tracking ball, that may include a reflective device. Accordingly, during the scanning of the measurement path, the remote device may be positioned to place the sensor device within a designated distance of a surface that is to be scanned. For example, the sensor device may be placed in contact with the surface, and may be mechanically coupled with the surface via the physical contact between the surface and the sensor device. The remote device may proceed along the measurement path and drag or roll the ball of the sensor device along the path. Variations in the height, depth, and other features of the surface may cause refraction and/or compression of the coupling device of the remote device, as well as corresponding variations in the position of the reflective device. Such variations may be measured and recorded at the designated measurement points and stored by the base device or other system component, such as the controller device.

Method 500 may proceed to operation 506 during which it may be determined whether or not additional measurement paths should be measured. In some embodiments, such a determination may be made based on a scanning protocol that has been generated by the controller device. As similarly discussed above, the measurement paths may have been determined by the controller device based on an analysis of measurement points included in the engineering data. In some embodiments, one or more data values identifying each of the measurement paths may be stored in a data object, and the scanning protocol may progress through the measurement paths in an ordered fashion. If it is determined that no additional measurement paths should be measured, method 500 may proceed to operation 512, which is discussed in greater detail below. However, if it is determined that additional measurement paths should be measured, method 500 may proceed to operation 508.

Accordingly, during operation 508 it may be further determined whether or not the base device should be moved. In some embodiments, movement of the base device may facilitate the scanning and measurement of different measurement paths that might not otherwise be accessible. For example, if the base device includes a tracking device that is a laser tracking device, then the line of sight between the base device and the additional measurement paths may be blocked by other portions of the large structure, or other objects that may be present in the assembly environment. Accordingly, the base device may be moved to a location where the line of sight is not blocked. As similarly discussed above, a determination of whether or not to move the base device may be made based on a scanning protocol that has been generated by the controller device based on available engineering data and/or metrology data.

If it is determined that the base device should not be moved, method 500 may return to operation 502 and a different measurement path may be scanned and measured. In some embodiments, the different measurement path may be for a different interface between components than was previously measured. In various embodiments, the different measurement path may be for a different surface of a different component entirely. For example, a first plurality of measurements may be made for a first surface of a first vehicle structure that may be the top of a rib of an airplane wing. A second plurality of measurements may then be made for a second surface of a second vehicle structure that may be the bottom of an upper surface panel that will be attached to the top of the rib. In another example, the second plurality of measurements may be for a second surface corresponding to a top of a different rib that may be adjacent to the previously measured rib.

Returning to operation 508, if it is determined that the base device should be moved, method 500 may proceed to operation 510. In various embodiments, during operation 510, the base device may be moved to a next scanning location. As similarly discussed above, the scanning locations may have been designated by the controller device, and the controller device may control the movement of the base device to the next scanning location. For example, the controller device may retrieve metrology data from a metrology device or system. The metrology data may identify a current location of the large structure, and a current location of the base device relative to the large structure. The controller device may also identify a position of the next scanning location based on available engineering data. The controller device may map the position to the metrology data and generate command and control data that configures the base device to move from its present location to the position of the next scanning location.

As previously discussed with reference to operation 506, once it has been determined that no additional measurement paths should be measured, method 500 may proceed to operation 512 during which measurement data may be generated based on the plurality of measurements. As similarly discussed above, the measurement data may be generated by the base device or the controller device. Accordingly, one or more data values identifying the measurements that were previously taken may be packaged as a data object. The data object may be stored, or may be transmitted to another system component, such as a controller device, for subsequent analysis.

Method 500 may proceed to operation 514 during which engineering data may be updated based on the measurement data. In various embodiments, a measured structural dimension of a surface may be different than the structural dimension that may have been included in the engineering data, which may be based on a computer model. Thus, according to some embodiments, a system component, such as a controller device, may be configured to update the engineering data with the measurement data. Accordingly, the data value included in the engineering data may be replaced with the data value included in the measurement data.

Method 500 may proceed to operation 516 during which shim dimensions may be determined based, at least in part, on the generated measurement data. As previously discussed, the shim dimensions may be determined by the controller device. According to various embodiments, the controller device may determine the shim dimensions by comparing the received measurement data to other measurement data. For example, the received measurement data may include a first set of measurements identifying surface features, such as height, depth, and relative position of a first surface which may be the top of a rib of an airplane. The controller device may compare the first set of measurements with a second set of measurements identifying surface features of a second surface which may be the underside of an upper surface panel that is to be placed on top of the rib. In this example, the second set of measurements may have also been included in the measurement data, or may have been previously measured and stored in a data store. In various embodiments, the location of the measurement points along the first measurement path will correspond with the placement of the measurement points of the second measurement path because the two surfaces are mating surfaces of an interface. Accordingly, the controller device may be configured to calculate the spatial or dimensional difference between the first surface and the second surface at each measurement point, as may be determined based on the difference between their respective relative positions. If there is no difference, no shim is required. However, if there is a difference, then the controller device may determine that a gap exists, and may further determine that the calculated spatial or dimensional difference of the gap is the thickness that the shim should have. Accordingly, the calculated spatial difference may be the shim dimension. In some embodiments, a shim dimension may be determined for each measurement point in each measurement path.

In various embodiments, the controller device may determine the shim dimension by comparing the received measurement data to existing engineering data. Returning to the previous example, if no second set of measurements is available, the controller device may approximate them based on existing structural dimensions included in the engineering data. The controller device may be configured to calculate the spatial or dimensional difference between the measurement data and the engineering data at each measurement point, and the controller device may calculate spatial or dimensional differences of the gaps based on the comparison. As similarly discussed above, the controller device may determine that the calculated distances are the thicknesses of the corresponding shims.

Furthermore, as similarly discussed above, once shim dimensions have been determined, according to some embodiments, a plurality of shims having the determined dimensions may be manufactured. Moreover, in various embodiments, the automated shimming system may be configured to place the shims at the appropriate locations. Thus, the remote device may be configured to have a payload bay that stores a plurality of shims and a remote controlled arm or manipulator that places the shims. The remote device may retrace its path along the different measurement paths and place shims at each previously measured location.

Figure 6:
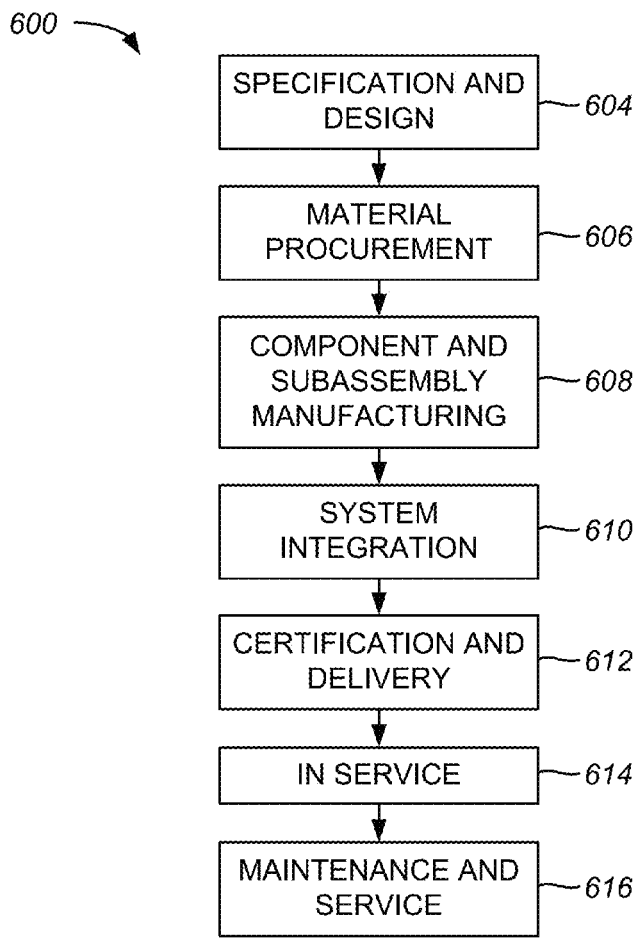
FIG. 6 illustrates a flow chart of an example of an aircraft production and service methodology, implemented in accordance with some embodiments.
Figure 7:
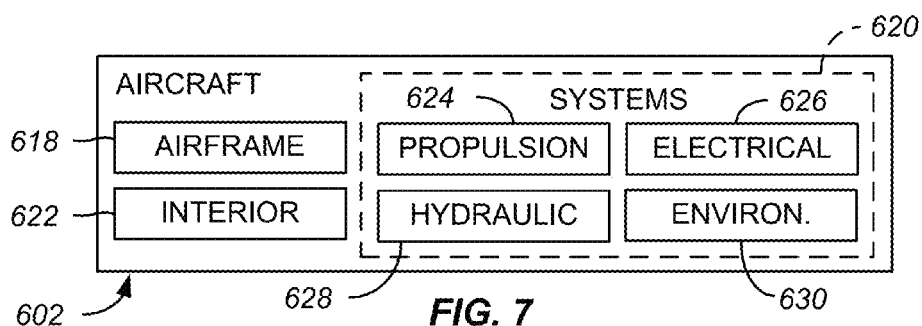
FIG. 7 illustrates a block diagram of an example of an aircraft, implemented in accordance with some embodiments.

Embodiments of the disclosure may be described in the context of an aircraft manufacturing and service method 600 as shown in FIG. 6 and an aircraft 602 as shown in FIG. 7. During pre-production, illustrative method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by illustrative method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
   a remote device configured to move along a first path relative to a first structure and, the remote device being an aerial drone that is further configured to move a sensor device along a plurality of measurement points included in the first path;
   a base device communicatively coupled to the remote device and configured to identify a position of the sensor device of the remote device at each measurement point of the plurality of measurement points, the base device being further configured to generate measurement data identifying at least one structural dimension of a first surface of the first structure; and
   a controller device communicatively coupled to each of the base device and the remote device, the controller device being configured to control operation of the base device and the remote device and further configured to determine at least one shim dimension associated with the first surface of the first structure, the at least one shim dimension based on the measurement data.

2. The system of claim 1, wherein the sensor device comprises a tracking ball and a reflective device coupled to the tracking ball, and wherein the base device comprises a tracking device configured to be optically coupled with the reflective device.

3. The system of claim 2, wherein the tracking ball is configured to mechanically couple with the first surface responsive to being within a designated distance of the first surface, wherein the mechanical coupling between the tracking ball and the first surface causes at least one change in a position of the tracking ball, and wherein the tracking device is configured to identify the change.

4. The system of claim 2, wherein the tracking ball is coupled to a housing of the sensor device via a mechanical arm, the mechanical arm being configured to determine a position of the tracking ball.

5. The system of claim 1, wherein the first surface of the first structure is included in an interface with a second surface of a second structure, and wherein the measurement data further comprises a first plurality of measurements associated with the first surface and a second plurality of measurements associated with the second surface.

6. The system of claim 5, wherein the shim dimension is determined based, at least in part, on the first plurality of measurements and the second plurality of measurements.

7. The system of claim 1, wherein base device is configured to move along a second path relative to the first structure, and wherein movement of the base device is based, at least in part, on metrology data identifying a first position of the first structure and a second position of the base device in an assembly environment.

8. The system of claim 1, wherein movement of the remote device is based, at least in part, on engineering data.

9. The system of claim 8, wherein the controller device is further configured to update the engineering data based on the generated measurement data.

10. The system of claim 1, wherein the first structure is a component of a wing of an airplane.

11. A method comprising:
    moving a remote device along a first path relative to a first structure, the first path being identified based on engineering data identifying a plurality of structural dimensions of the first structure, the remote device being an aerial drone;
    generating a first plurality of measurements along the first path, the first plurality of measurements being associated with a first plurality of measurement points along the first path, the first plurality of measurements identifying at least one structural dimension of a first surface of the first structure;
    generating measurement data based on the first plurality of measurements, the measurement data being generated by a base device communicatively coupled to the remote device; and
    determining at least one shim dimension associated with the first surface of the first structure based on the measurement data.

12. The method of claim 11, wherein the generating of the measurement data comprises:
    receiving, at the base device, the first plurality of measurements from aسensor device included in the remote device, the remote device including a tracking ball and a reflective device.

13. The method of claim 12, wherein the base device includes a tracking device, and wherein the receiving the first plurality of measurements comprises:
    measuring at least one position of the tracking ball via the tracking device.

14. The method of claim 11 further comprising:
    updating the engineering data based on the generated measurement data.

15. The method of claim 11, wherein the first surface of the first structure is included in an interface with a second surface of a second structure.

16. The method of claim 15 further comprising:
generating a second plurality of measurements along a second path relative to the first structure, the second plurality of measurements being associated with a second plurality of measurement points along the second path, wherein the generated measurement data includes the second plurality of measurements associated with the second surface of the second structure, and wherein the shim dimension is determined based, at least in part, on the first plurality of measurements and the second plurality of measurements.

17. The method of claim 11, wherein the first structure is a component of a wing of an airplane.

18. A device comprising:
a first communications interface configured to communicate with a remote device configured to move along a first path relative to a first structure, the remote device being an aerial drone that is further configured to move a sensor device along a first plurality of measurement points included in the first path;
a second communications interface configured to communicate with a base device, the base device being configured to identify a position of the sensor device of the remote device at each measurement point of the plurality of measurement points and further configured to generate measurement data identifying at least one structural dimension of a first surface of the first structure; and
a controller configured to control movement of the base device and the remote device via the first and second communications interfaces, and further configured to determine at least one shim dimension associated with the first surface of the first structure, the at least one shim dimension being determined based on the measurement data.

19. The device of claim 18, wherein the first surface of the first structure is included in an interface with a second surface of a second structure, wherein the measurement data includes a first plurality of measurements associated with the first plurality of measurement points along the first path and a second plurality of measurements associated with the second surface of the second structure, and wherein the controller is configured to determine the shim dimension based, at least in part, on the first plurality of measurements and the second plurality of measurements.

20. The device of claim 18, wherein the first structure is a component of a wing of an airplane.

* * * * *